(12) United States Patent
Yee (10) Patent No.: US 6,965,553 B2
(45) Date of Patent: Nov. 15, 2005

(54) LIGHT EMITTING MODULE, OPTICAL DETECTING MODULE, OPTICAL PICKUP APPARATUS AND MANUFACTURING METHODS THEREOF

(75) Inventor: Young Joo Yee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 36 days.

(21) Appl. No.: 10/721,094

(22) Filed: Nov. 26, 2003

(65) Prior Publication Data

US 2004/0170110 A1      Sep. 2, 2004

(30) Foreign Application Priority Data

Nov. 29, 2002    (KR) .................... 10-2002-0075492

(51) Int. Cl.[7] ............................................... G11B 7/00
(52) U.S. Cl. ..................................................... 369/121
(58) Field of Search ................................ 369/121, 122, 369/112.23, 44.11, 44.12

(56) References Cited

U.S. PATENT DOCUMENTS 6,496,469 B1 * 12/2002 Uchizaki ................... 369/122

FOREIGN PATENT DOCUMENTS

JP         10-256648 A      9/1998
JP         2001-102676 A    4/2001

* cited by examiner

*Primary Examiner*—Nabil Hindi
(74) *Attorney, Agent, or Firm*—Birch, Stewart, Kolasch & Birch, LLP (57) ABSTRACT

Disclosed are a light emitting module, an optical detecting module, an optical pickup apparatus formed by coupling the ultra-minimized light emitting module and the optical detecting module, and manufacturing methods thereof. To this end, ultra-minimization, a micro machining technique fit to a mass production, and a semiconductor device assembly manufacturing process are applied, thereby reducing a component cost and increasing uniformity of components.

23 Claims, 10 Drawing Sheets

LIGHT EMITTING MODULE, OPTICAL DETECTING MODULE, OPTICAL PICKUP APPARATUS AND MANUFACTURING METHODS THEREOF

This Nonprovisional application claims priority under 35 U.S.C. § 119(a) on Patent Application No(s). 10-2002-0075492 filed in KOREA on Nov. 29, 2002, the entire contents of which are hereby incorporated by reference.

BACKGROUND OF THE INVENTION

1. Field of the Invention

The present invention relates to an optical pickup apparatus for recording and storing optical information in an optical data storage, and more particularly, to a light emitting module, an optical detecting module, and an optical pickup apparatus formed by coupling the light emitting module and the optical detecting module which are ultra-minimized to be applied to a portable optical recording apparatus, and manufacturing methods thereof.

2. Description of the Conventional Art

Recently, a digital multimedia environment develops, a personal computer is generalized, a data network is universalized, and a wireless and mobile communication technique develops. According to this, a mobile information communication means such as a digital TV, a digital audio, a personal digital assistant, and a visual phone is universalized, and thus greatly increasing an information capacity which has to be processed and stored from the apparatuses and miniaturizing the apparatuses with a light weight are being considered as main technical tasks.

According to the conventional art, at the time of constituting a pickup optical system such as a CD and a DVD, independent passive optical components such as a focusing lens, a collimating lens, a polarizing beam splitter, and etc. are aligned and assembled in accordance with an optical path in an assembly device manufactured in advance. Also, at the time of constituting an optical detecting unit, a laser diode and a photodiode which are individually packaged are assembled in accordance with an optical path in an assembly device manufactured in advance.

However, in the conventional method, it is difficult to minimize each optical component and to minimize the laser light source and the photodiode due to a respective separated form. Therefore, it is difficult to apply the components to a portable optical recording apparatus.

SUMMARY OF THE INVENTION

Therefore, an object of the present invention is to provide a light emitting module, an optical detecting module, and an optical pickup apparatus formed by coupling the light emitting module and the optical detecting module which are ultra-minimized to be applied to a portable optical recording apparatus, and manufacturing methods thereof.

Another object of the present invention is to provide a light emitting module, an optical detecting module, and an optical pickup apparatus formed by coupling the light emitting module and the optical detecting module capable of being massively produced, reducing a component cost, and increasing a product uniformity by applying a micro machining technique and a semiconductor device assembly manufacturing process, and manufacturing methods thereof.

To achieve these and other advantages and in accordance with the purpose of the present invention, as embodied and broadly described herein, there is provided an optical detecting module comprising: a silicon substrate where a cavity is formed up and down at a middle portion thereof; an aperture membrane formed on the cavity of the silicon substrate and provided with an optical aperture for passing light; and a photo diode formed at an upper surface of the silicon substrate for receiving light emitted from a light source and an optical signal reflected from an optical disc and having predetermined information and converting into an electric signal for detection.

The present invention also provides a light emitting module comprising: an SOI substrate of a plate type provided with a silicon dioxide film between an upper silicon layer and a lower silicon layer; an electrode metal pad attached to a part where the upper silicon layer is stripped among an upper surface of the SOI substrate; a laser diode attached to an upper surface of the electrode metal pad; and a mirror slantly formed at one side of the upper silicon layer with 45° for reflecting light emitted from the laser diode.

The present invention also provides an optical pickup apparatus comprising: a light emitting module comprising an SOI substrate of a plate type provided with a silicon dioxide film between an upper silicon layer and a lower silicon layer, an electrode metal pad attached to a part where the upper silicon layer is stripped among an upper surface of the SOI substrate, a laser diode attached to an upper surface of the electrode metal pad, and a mirror slantly formed at one side of the upper silicon layer with 45° for reflecting light emitted from the laser diode; an optical detecting module comprising a silicon substrate arranged at an upper portion of the light emitting module and provided with a cavity at a middle portion thereof, an aperture membrane formed on the cavity of the silicon substrate and provided with an optical aperture for passing light at a center portion thereof, and a photo diode formed at an upper surface of the silicon substrate for converting light emitted from the laser diode and an optical signal reflected from an optical disc and having information into an electric signal for detection; and a spacer bonded between the light emitting module and the optical detecting module for uniformly maintaining a gap therebetween.

The present invention also provides a method for manufacturing an optical detecting module comprising: a first step of patterning a photosensitive film on a silicon substrate by using a silicon substrate of {100} crystal direction doped with N-type impurities as a starting material thus to form an opening window for injecting p type impurities, injecting the p type impurities into the opening window by using the photosensitive film as a mask, and stripping the photosensitive film and performing a thermal process for annealing and diffusion thus to form an intrinsic well; a second step of patterning a photosensitive film on the silicon substrate thus to form the p type impurities at a partial region of the intrinsic well, stripping the photosensitive film and performing a thermal process for annealing and diffusion thus to form a photodiode p type junction, and completing a photodiode of an p-I-n junction structure by a thermal process; a third step of respectively depositing multi-layered thin films of a three-layer structure of silicon dioxide film/silicon nitride film/silicon dioxide film at upper and lower surfaces of the silicon substrate where the photodiode is completed, stripping a part which has not been covered by the photosensitive film among the multi-layered thin film formed at the upper surface of the silicon substrate by using a photosensitive film patterned by a photolithography process as an etching mask, and then stripping the photosensitive film; a fourth step of depositing a metal thin film in order to form a photodiode and a reflective thin film on the silicon substrate, patterning a photosensitive film at a surface of the deposited metal thin film by a photolithography process, then selectively stripping the metal thin film by using the photosensitive film as an etching mask, then stripping the photosensitive film, and thereby forming a photodiode metal electrode wire, a metal electrode pad, and the reflective thin film; a fifth step of depositing a metal thin film on the silicon substrate and then partially etching the etching mask thin film located at a part where an optical aperture will be formed by a photolithography process and a thin film etching technique; a sixth step of patterning a photosensitive film at a lower surface of the silicon substrate thus to align the photosensitive film with an aperture membrane formed on a wafer, patterning an etching mask thin film at a lower surface of the silicon substrate by using the photosensitive film, and stripping the photosensitive film thus to obtain an etching region which will be processed by a wet anisotropy silicon etching technique in the next step; a seventh step of etching silicon of a lower surface of the substrate exposed through the etching mask thin film by impregnating with aqueous anisotropic silicon etchant thus to form a cavity; an eighth step of stripping a multi-layered thin film exposed through the etching mask thin film formed at an upper surface of the silicon substrate by a reactive ion etching, and stripping the mask thin film thus to complete the optical aperture; and a ninth step of bonding a spacer formed of glass material with the silicon substrate as a wafer form, and dicing as an individual chip unit.

The present invention also provides a method for manufacturing a light emitting module comprising: a first step of preparing an SOI substrate as a starting material and respectively forming mask thin films such as a silicon nitride film or a silicon dioxide film which are not etched by anisotropic silicon ethant and which will be used as an anisotropy silicon etching mask layer at upper and lower surfaces of the SOI substrate; a second step of coating a photosensitive film on a surface of the etching mask thin film formed on an upper silicon layer of the SOI substrate, pattering the photosensitive film by a photolithography process, and stripping the exposed etching mask thin film with a reactive ion etching technique by using the photosensitive film as an etching mask thus to define an anisotropic etching region and strip the remaining photosensitive film; a third step of etching the upper silicon layer exposed through the etching mask thin film by impregnating with anisotropic silicon etchant thus to firstly stop the etching at {111} crystal plane of the upper silicon layer and then to secondly stop the etching at a silicon dioxide film, and stripping the mask thin films of the upper and lower surfaces of the SOI substrate used as an etching mask after the anisotropic silicon etching processing; a fourth step of coating a thick photosensitive film on a surface of the upper silicon layer where a crystal plane is formed, patterning by a photolithography, and depositing a metal thin film on the patterned photosensitive film; a fifth step of melting the thick photosensitive film in organic solvent by impregnation, stripping the photosensitive film and the metal thin film formed on the photosensitive film, and leaving the metal thin film only at a predetermined region of the SOI substrate on the oxidation film where the photosensitive film did not exist thus to form an electrode metal pad; and a sixth step of aligning/assembling a spacer for an alignment/assembly with the SOI substrate where a mirror and the electrode metal pad are formed, then dicing as an individual chip unit, and then aligning the laser diode with the electrode metal pad by using a solder bonding technique.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 11A to 11J are sectional views showing manufacturing processes of the optical detecting module according to the present invention; and FIGS. 12A to 12F are sectional views showing a manufacturing processes of the light emitting module according to the present invention.

DETAILED DESCRIPTION OF THE PREFERRED EMBODIMENTS

Figure 1:
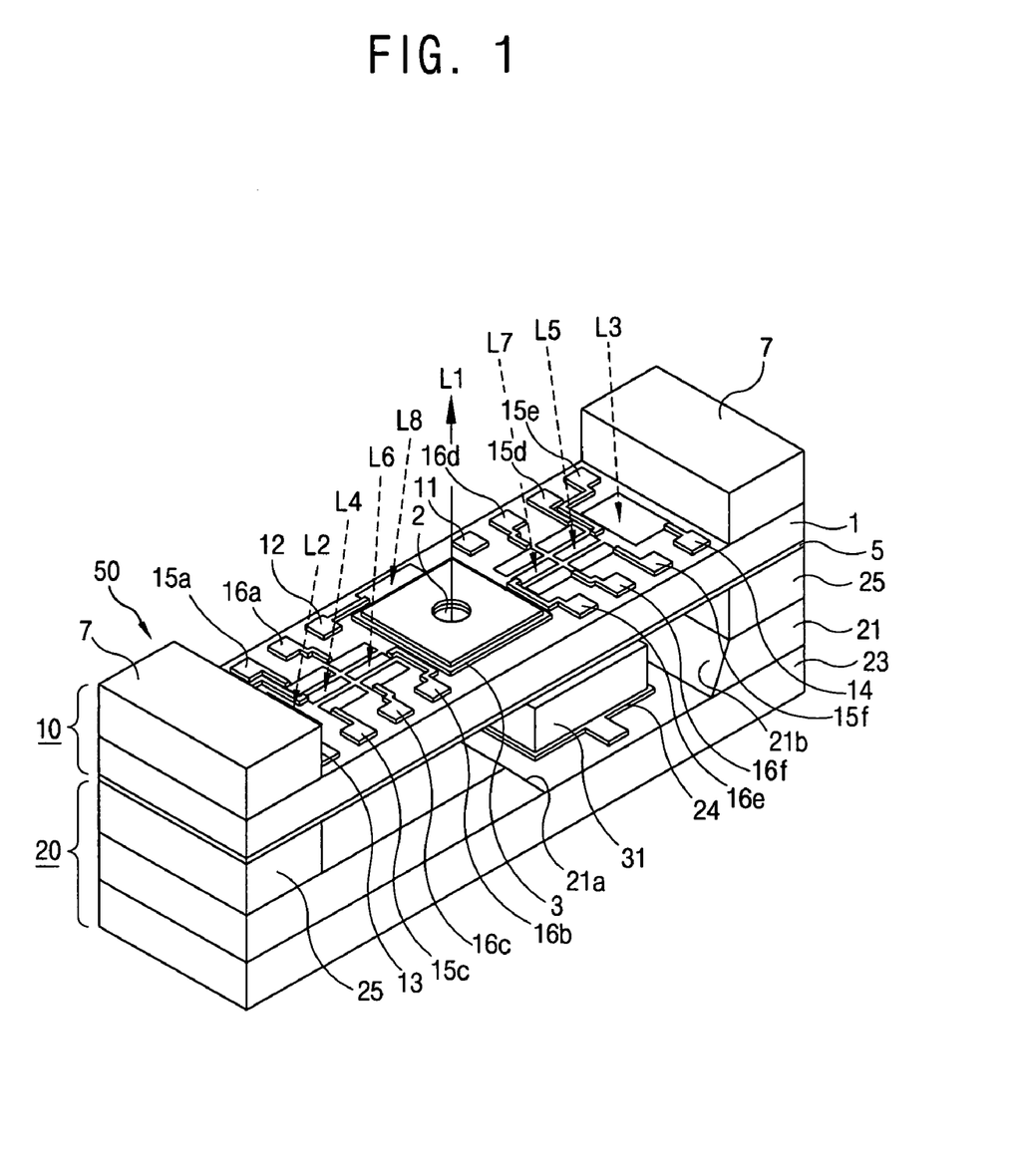
FIG. 1 is a perspective view showing an optical pickup apparatus according to the present invention.
Figure 2:
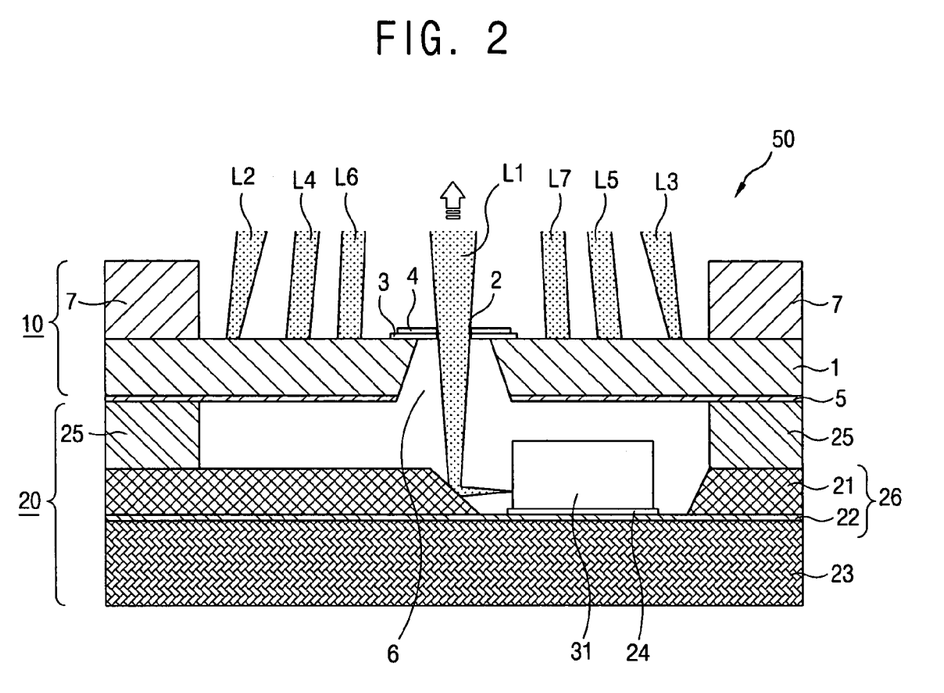
FIG. 2 is a sectional view of FIG. 1.
Figure 3:
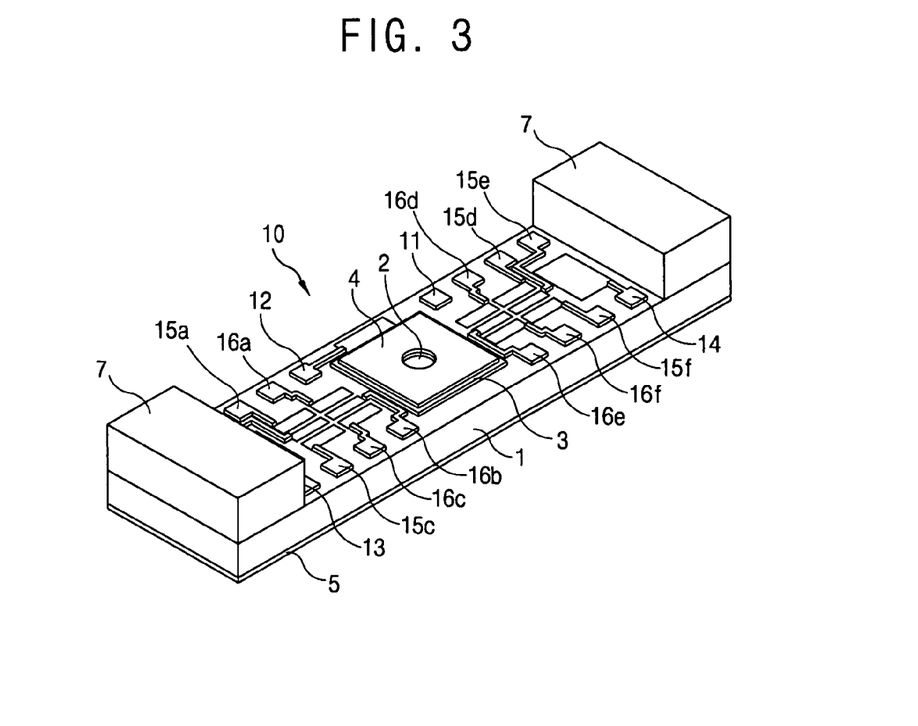
FIG. 3 is a perspective view showing an optical detecting module according to the present invention.
Figure 4:
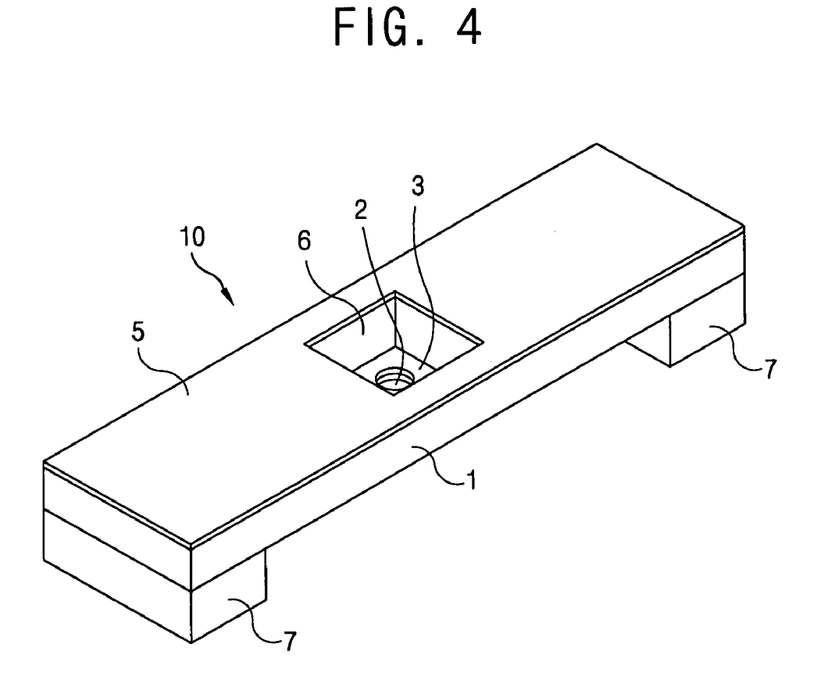
FIG. 4 is a rear surface perspective view of FIG. 3.
Figure 5:
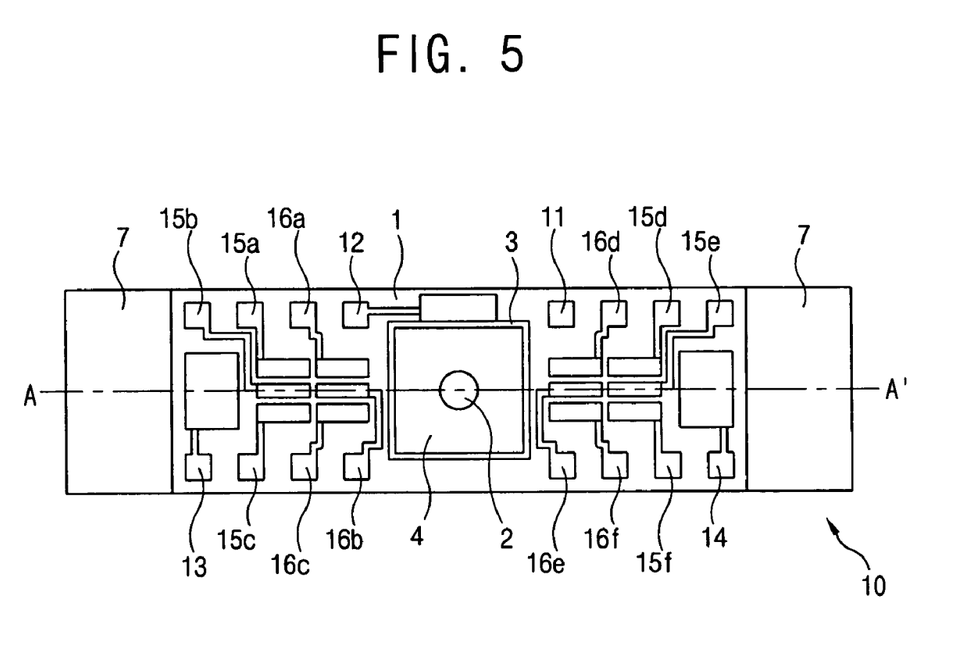
FIG. 5 is a plane view of FIG. 3.
Figure 6:
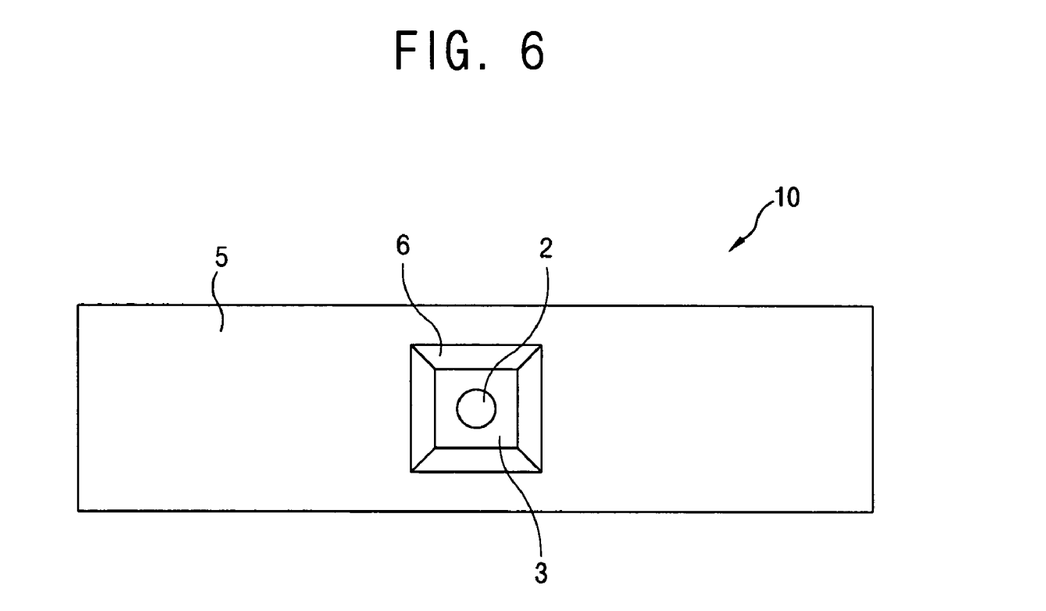
FIG. 6 is a rear surface view of FIG. 5.
Figure 7:
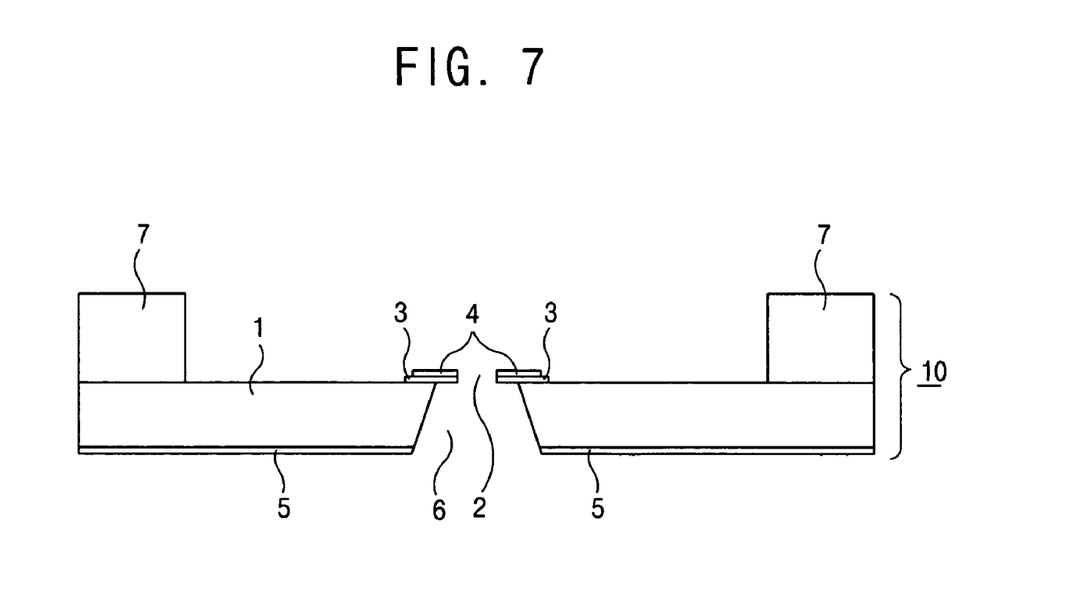
FIG. 7 is a sectional view taken along line A–A' of FIG. 5.

Reference will now be made in detail to the preferred embodiments of the present invention, examples of which are illustrated in the accompanying drawings. FIG. 1 is a perspective view showing an optical pickup apparatus according to the present invention, and FIG. 2 is a sectional view of FIG. 1.

As shown, the optical pickup apparatus 50 according to the present invention includes an optical detecting module 10 and a light emitting module 20 coupled to the optical detecting module 10.

Laser beam L1 emitted from the light emitting module 20 passes through an aperture 2 formed at the optical detecting module 10, and is made to be incident on a pickup optical system (not shown) constituted with passive optical components such as a collimating lens, an objective lens, and each kind of optical divider. The laser beam is focused and irradiated on a recording layer of an optical disc (not shown), and light reflected from the recording layer of the optical disc passes through a predetermined optical divider by retrograding an optical path and is divided into a plurality of laser beams L2–L8, thereby being made to be incident on photodiodes 12–16 formed at the optical detecting module 10.

At this time, a data signal stored in the recording layer of the optical disc, a focus compensating signal of a laser light irradiated on the recording layer, a feedback signal for maintaining an intensity of emitted laser beam as a predetermined level, and etc. are obtained.

Hereinafter, the optical detecting module will be explained with reference to FIGS. 3 to 7.

As shown in FIGS. 3 to 7, the optical detecting module 10 includes a silicon substrate 1 where a photodiode such as an P-N junction or an P-I-N junction diode for converting an optical signal reflected form the optical disc and having predetermined information into an electric signal and detecting is integrated.

An electrode for applying an electric signal output of an optical signal converted in the photodiode to an external signal processing circuit, a power circuit, and etc. is arranged in the photodiode, so that the photodiode means a photodiode including an electrode.

A cavity 6 etched by a micro machining technique is formed at a lower middle portion of the silicon substrate 1, and an aperture membrane 3 composed of a composite thin film layer is formed at an upper middle portion of the silicon substrate 1. A reflective thin film 4 of a metal having a predetermined thickness or a composite thin film layer structure is formed at an upper surface of the aperture membrane 3. An opt An optical aperture 2 for passing laser beam is formed at a middle portion of the aperture membrane 3 and the reflective thin film 4.

In case that laser beam emitted from a laser light source returns to a laser diode 31, a performance of the laser diode 31 can be deteriorated. Therefore, the reflective thin film 4 is preferably formed of an opaque material for shielding laser beam which returns to the laser diode 31.

The photodiode is constituted with a common ground electrode 11, an emitted laser beam monitoring photodiode 12 for monitoring an optical output from the laser light source and maintaining the optical output as a predetermined level through a feedback control circuit, radio frequency signal detecting photodiodes 13 and 14 having data information included in an optical signal reflected from the recording layer of the optical disc; and photodiode segments 15 and 16 (15a–15f and 16a–16f) arranged right and left by being divided into six regions.

A radio frequency signal which is a data signal stored in the recording layer of the optical disc is detected by an output difference of two photodiodes 13 and 14.

The photodiode segments 15 and 16 detect a focus shape and information for a focus depth formed on the optical disc by using a combination of output signals of the respective segment 15 and 16. The focus state detecting signal is used in a focus servo control through the feedback control circuit, thereby maintaining a concentrated focus performance uniformly.

The cavity 6 formed at the lower portion of the laser optical aperture 2 is processed as a pyramid shape by an etching anisotropy silicon etching method, and a sidewall of the cavity 6 is slantly formed.

The cavity 6 was manufactured by a dry etching such as a silicon deep RIE which is a kind of a reactive ion etching.

A spacer 7 having a predetermined thickness is bonded at a predetermined region of the upper surface of the silicon substrate 1, thereby completing the optical detecting module 10.

The spacer 7 is formed by using soda lime glass containing Na (sodium) of a constant concentration such as PYREX glass as a starting material.

The starting material is polished as a desired thickness, and a region except a junction part with the silicon substrate is striped. Then, the starting material, that is, the spacer 7 is aligned/assemble with the silicon substrate 1 by an anodic bonding, or a solder bonding method for patterning a metallic solder at the junction part in advance and then assembling by heat is applied.

Figure 8:
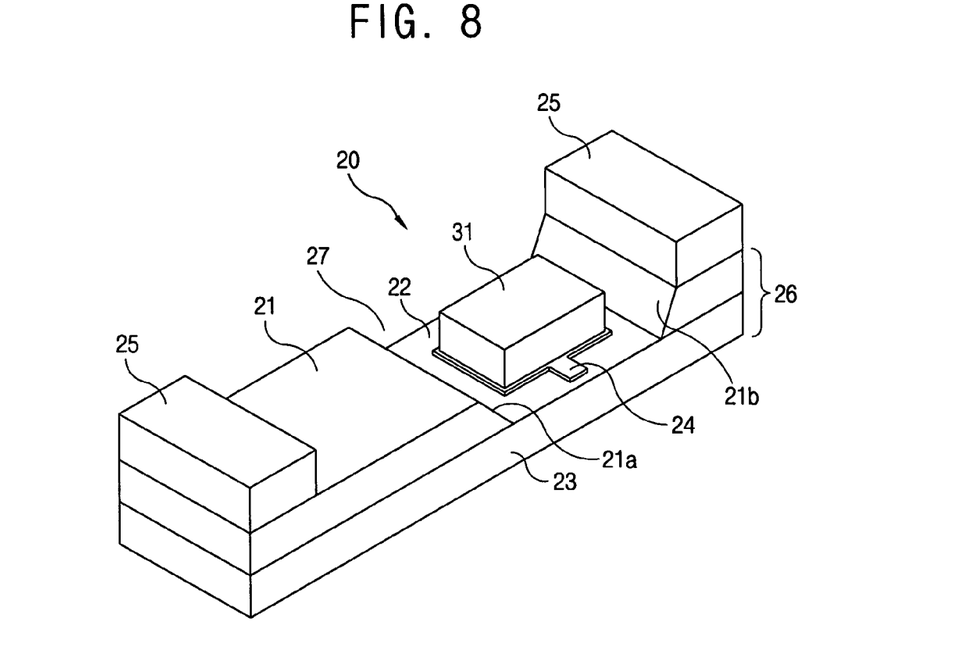
FIG. 8 is a perspective view of a light emitting module according to the present invention.
Figure 9:
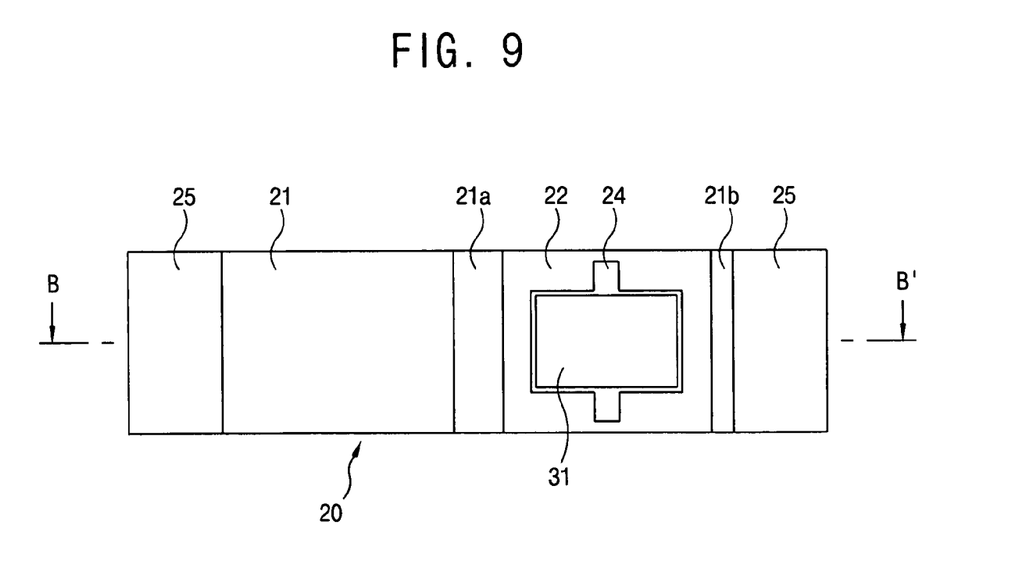
FIG. 9 is a plane view of FIG. 8.
Figure 10:
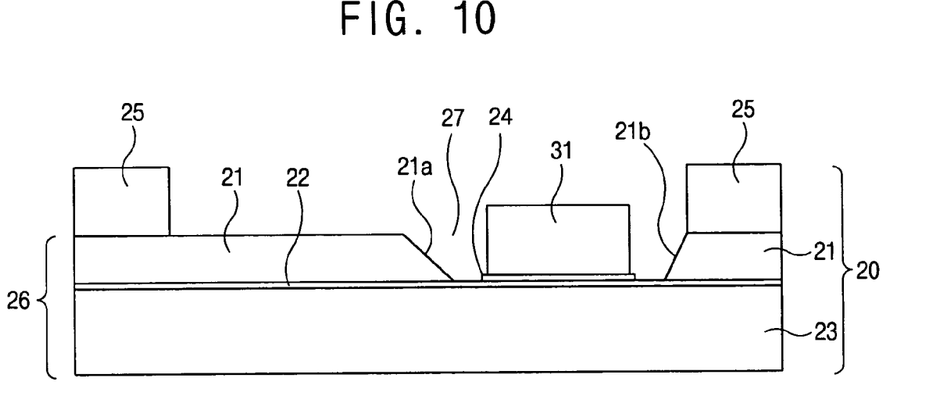
FIG. 10 is a sectional view taken along line B–B' of FIG. 9.

As shown in FIGS. 8 to 10, in the light emitting module 20, an etching stopping oxidation film 22 is formed at an upper surface of a lower silicon layer 23 having a certain thickness and an area, and a certain region of an SOI (silicon on insulator) substrate 26 that an upper silicon layer 21 is formed on the etching stopping oxidation film 22 is stripped by an anisotropy silicon etching process. Herein, an electrode metal pad 24 is solder-bonded on the etching stopping oxidation film 22 exposed to a stripped part 27, and the laser diode 31 which is a light emitting device is bonded on the electrode metal pad 24.

At one side of the stripped part 27 where the laser diode 31 is installed, more specifically, at the upper silicon layer 21, a mirror 21a having an inclination surface of 45° is formed at the upper silicon layer 21 to reflect light emitted from the laser diode 31.

The electrode metal pad 24 of the laser diode 31 is driven by using a photolithography technique of a semiconductor assembly manufacturing process, thereby precisely maintaining an alignment error between the reflective mirror 21a of 45° and the electrode metal pad 24 as a micrometer level.

Before the junction of the laser diode 31, a second spacer 25 formed of soda lime glass for an align assembly is assembled on the upper silicon layer 21 as a general wafer processing shape by using an anodic bonding and etc. Then, the second spacer 25 is diced as an individual chip form and then the laser diode 31 is assembled thereto by a solder junction method, thereby completing the light emitting module 20.

Hereinafter, manufacturing methods of the optical detecting module will be explained in more detail.

FIGS. 11A to 11J are sectional views showing manufacturing processes of the optical detecting module according to the present invention.

Figure 11A:
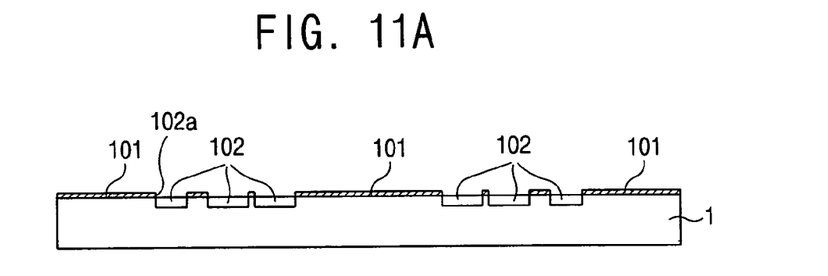

As shown in FIG. 11A, first, the silicon substrate 1 of {100} crystal direction doped with N-type impurities is used as a starting material.

A photosensitive film 101 is patterned on the substrate 1 by using a photolithography process thus to form an opening window 102a for injecting p type impurities such as boron or $BF_2$, and the p type impurities are injected into the opening window 102a with an ion implantation method by using the photosensitive film 101 as a mask. At this time, the p type impurities of amount corresponding to a concentration of n type impurities of the silicon substrate 1 are injected, then the photosensitive film 101 is stripped, and a thermal process for annealing and diffusion is performed, thereby forming an intrinsic well 102.

Figure 11B:
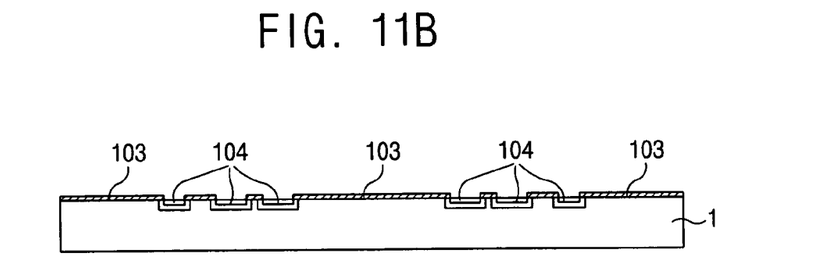

Next, as shown in FIG. 11B, a photosensitive film 103 is patterned on the substrate 1 by using a photolithography process thus to form p type impurities such as boron or $BF_2$ at a partial region of the intrinsic well 102. Then, the photosensitive film 103 is stripped, and a thermal process for annealing and diffusion is performed, thereby forming a photodiode p type junction 104.

Figure 11C:
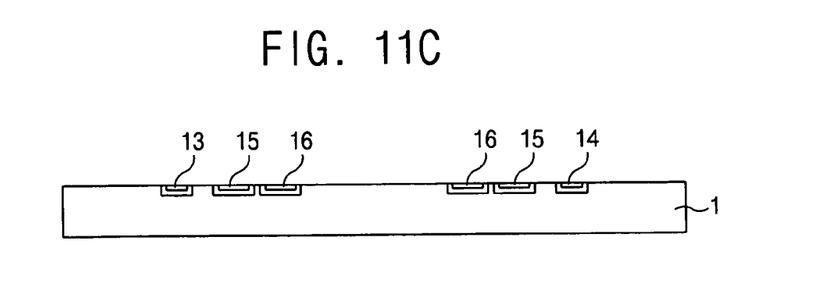

As shown in FIG. 11C, at the time of the thermal process, an oxidation film generated at a surface of the silicon substrate 1 is stripped, thereby completing photodiodes 12 (not shown) and 13–16 having an p-I-n junction structure.

Figure 11D:
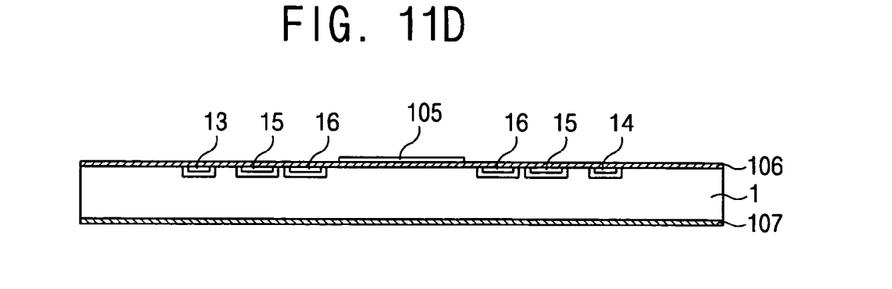

As shown in FIG. 11D, a low stress silicon nitride is respectively deposited at upper and lower surfaces of the silicon substrate 1 where the photodiodes 12 (not shown) and 13–16 are completed by a chemical vapor deposition method.

It is also possible to respectively deposit multi-layered thin films 106 and 107 which are stress compensated as a three-layer structure of silicon dioxide film/silicon nitride film/silicon dioxide film at the upper and lower surfaces of the silicon substrate 1.

By using a photosensitive film 105 patterned by a photolithography process, a part which has not been covered by the photosensitive film 105 among the multi-layered thin film 106 formed at the upper surface of the silicon substrate 1 is stripped, and then the photosensitive film 105 is stripped.

Figure 11E:
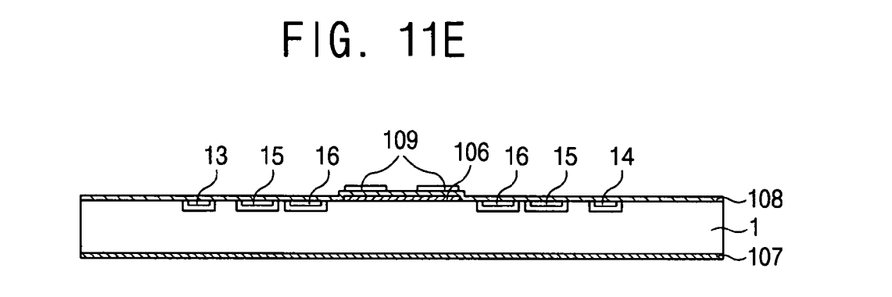

Next, as shown in FIG. 11E, in order to form the photodiodes 12 (not shown) and 13–16 and the reflective thin film 4 (refer to FIG. 11F) on the silicon substrate 1, a metal thin film 108 is deposited. Then, a photosensitive film 109 is patterned at a surface of the deposited metal thin film 108 by a photolithography process, then the metal thin film 108 is selectively stripped by using the photosensitive film 109 as an etching mask, and then the photosensitive film 109 is stripped, thereby forming a photodiode metal electrode wire, a metal electrode pad, and the reflective thin film 4.

Figure 11F:
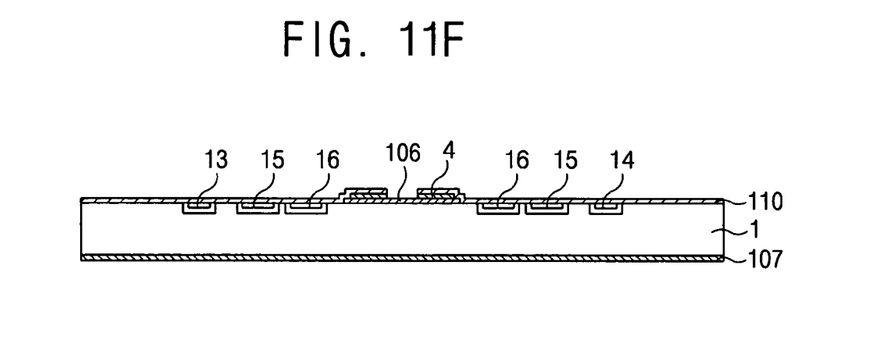

Next, as shown in FIG. 11F, a metal thin film 11—such as chrome which will be used as an etching mask thin film is deposited on the silicon substrate 1, and then the etching mask thin film 110 located at a part where the optical aperture 2 (refer to FIG. 11I) will be formed is partially stripped by a photolithography process and a thin film etching technique.

Figure 11G:
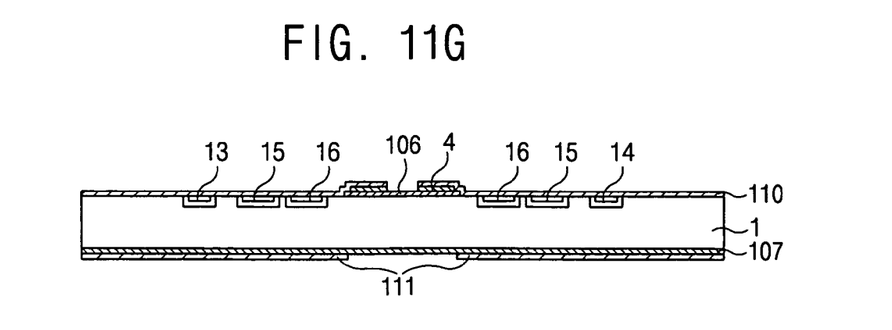

Next, as shown in FIG. 11G, a photosensitive film 111 is patterned at a lower surface of the silicon substrate 1. At this time, the photosensitive film 111 is aligned with the aperture membrane formed on the wafer by using a both-surface aligning technique.

The multi-layered thin film 107 is patterned at the lower surface of the silicon substrate 1 with a reactive ion etching technique by using the photosensitive film 111, and then the photosensitive film 111 is stripped, thereby obtaining a region which will be processed in the next step by a wet anisotropy silicon etching technique.

Figure 11H:
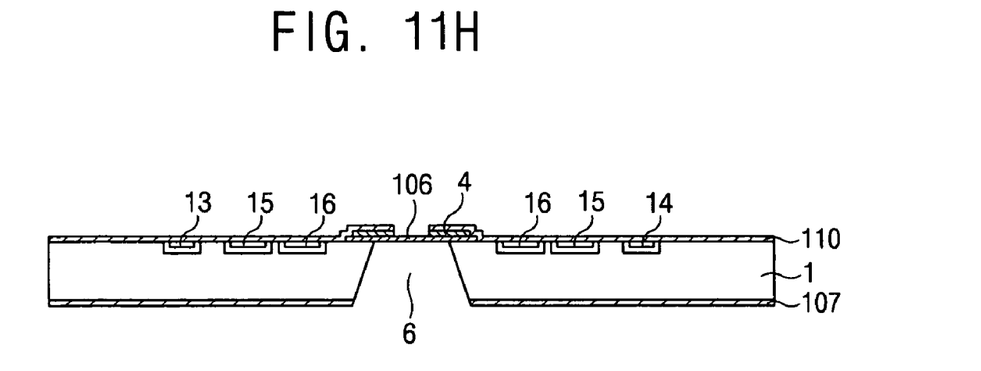

Then, as shown in FIG. 11H, silicon of a lower surface of the substrate 1 exposed through the multi-layered thin film 107 is etched by impregnating with aqueous anisotropic silicon etchant such as KOH (potassium hydroxidation film), NaOH, TMAH (tetra-methyl ammonium hydroxidation film), EDP (ethylenediamine pyrocatecol), and etc., thereby processing the cavity 6 of a pyramid shape having a slant lateral wall surface surrounded by {111} crystal plane. In this process, the silicon etching is stopped at the low stress thin film or the multi-layered thin film 106.

Figure 11I:
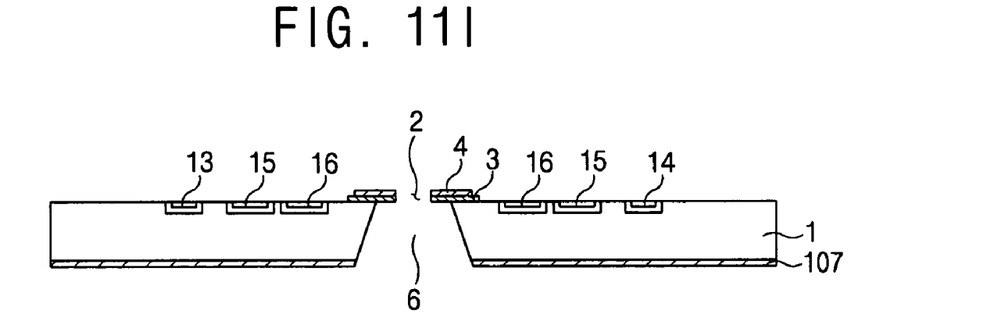

Next, as shown in FIG. 11I, the low stress thin film or the multi-layered thin film 106 exposed through the etching mask thin film 110 are stripped by a reactive ion etching, and the mask thin film 110 is stripped, thereby completing the optical aperture 2.

Figure 11J:
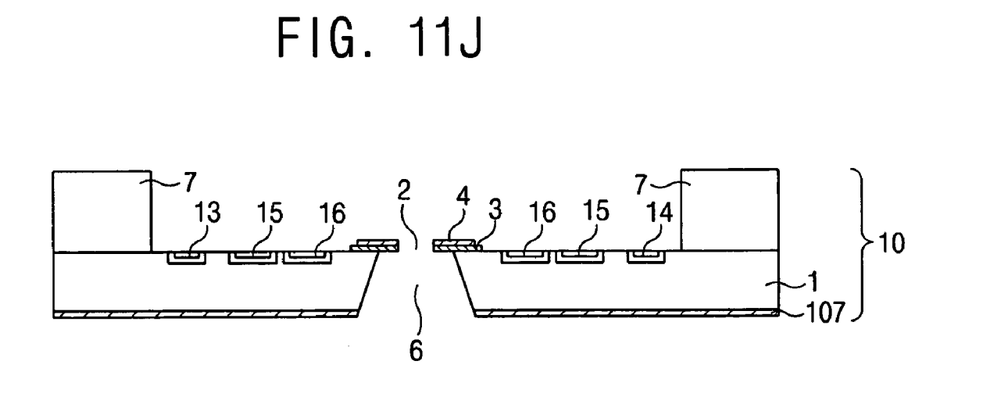

Finally, as shown in FIG. 11J, the spacer 7 formed of glass material is bonded with the silicon substrate 1 as a wafer form and then diced as an individual chip unit, thereby completing the optical detecting module 10.

A glass substrate where the plurality of spacer 7 are formed is processed as a wafer form, and the glass substrate can be bonded with the silicon substrate 1 by an anodic bonding for applying a high voltage to said two substrates at the high temperature.

It is also possible that a metal solder is formed at a bonding surface of the glass substrate in advance, and a silicon wafer and the glass substrate of a wafer form are aligned to each other by a solder bonding for applying heat and welding a solder.

Hereinafter, manufacturing methods for the light emitting module according to the present invention will be explained as follows.

FIGS. 12A to 12F are sectional views showing a manufacturing processes of the light emitting module according to the present invention.

Figure 12A:
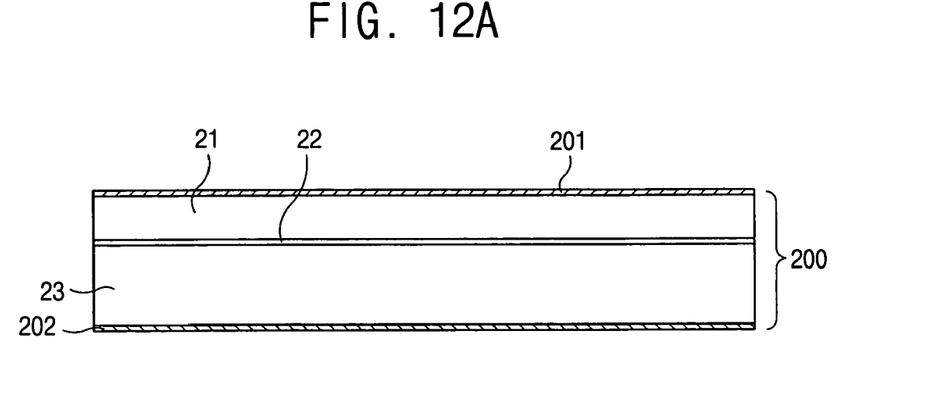

As shown in FIG. 12A, an SOI substrate 200 is used as a starting material thus to respectively form mask thin films 201 and 202 such as a silicon nitride film or a silicon dioxide film which are not etched by anisotropic silicon ethant and which will be used as an anisotropy silicon etching mask layer at the upper and lower surfaces of the SOI substrate 200 by an oxidation method or a deposition method.

The SOI substrate 200 is composed of a lower silicon substrate 23, an upper silicon layer 21 having a surface slantly polished with 9.74° for {100} crystal direction, and a silicon dioxide film 22 interposed between said two silicon regions.

Figure 12B:
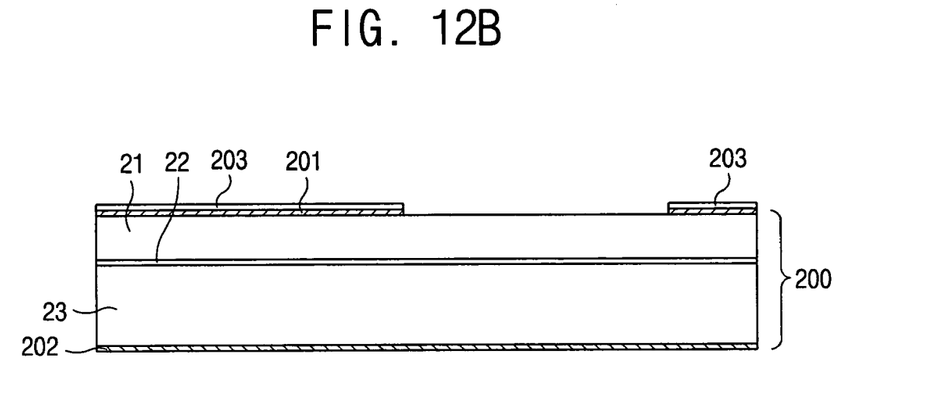

Next, as shown in FIG. 12B, a photosensitive film 203 is coated on a surface of the etching mask thin film 201 formed on the upper silicon layer 21 of the SOI substrate 200, and the photosensitive film 203 is patterned by a photolithography process. Then, by using the photosensitive film 203 as an etching mask, the exposed etching mask thin film 201 is stripped by a reactive ion etching technique, thereby defining an anisotropic etching region and stripping the remaining photosensitive film 203.

Figure 12C:
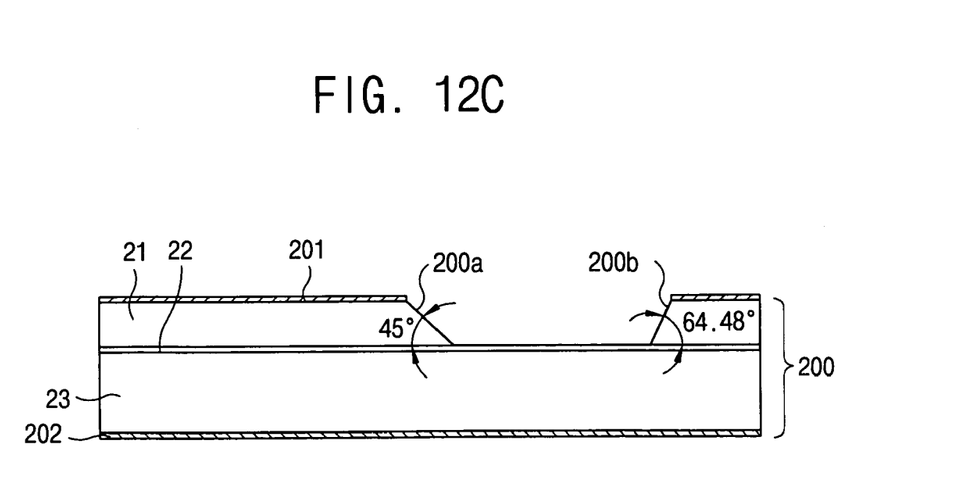

Next, as shown in FIG. 12C, the upper silicon layer 21 exposed through the etching mask thin film 201 is etched by being impregnated with anisotropic silicon etchant such as KOH, TMAH, EDP, and NaOH. According to this, the etching is firstly stopped at {111} crystal plane of the upper silicon layer 21, and then the etching is secondly stopped at the silicon dioxide film 22, thereby precisely obtaining an etching depth of the upper silicon layer 21. Especially, the {111} crystal plane, an etching remaining surface formed after etching the upper silicon layer 21 having a surface slantly polished with 9.74° for the {100} crystal plane has a crystal plane 200a having an inclination of 45° for a surface of the SOI substrate 200. Another etching remaining surface, a {111} crystal plane 200b facing the inclination surface has an inclination of 64.48° for the surface of the substrate 200. Herein, a characteristic of a crystal structure that the {100} crystal direction of silicon and the {111} crystal direction form 54.74° is used. After completing the anisotropic silicon etching process, the mask thin films 201 and 202 of the upper and lower surfaces of the SOI substrate 200 used as an etching mask are stripped.

Figure 12D:
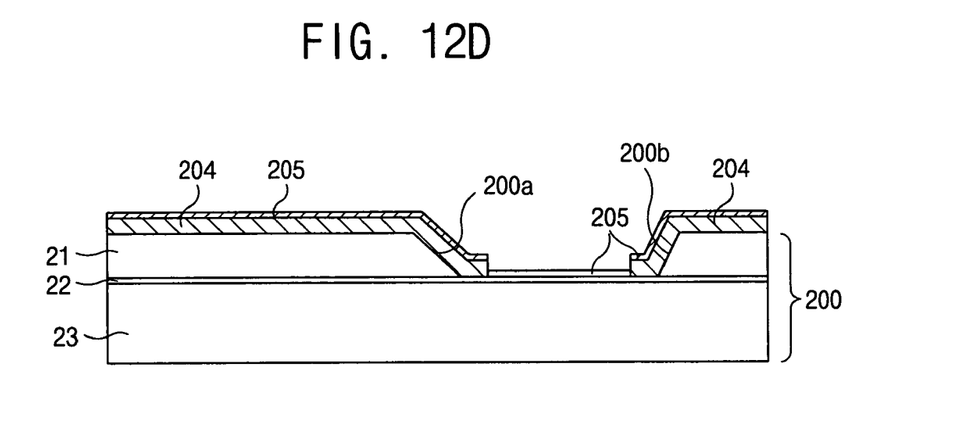

Next, as shown in FIG. 12D, a thick photosensitive film 204 is coated on a surface of the upper silicon layer 21 where the crystal plane 200a having an inclination of 45° is formed, and patterned by a photolithography. Then, a metal thin film 205 is deposited on the patterned photosensitive film 204 by an evaporation method or a sputtering method.

Figure 12E:
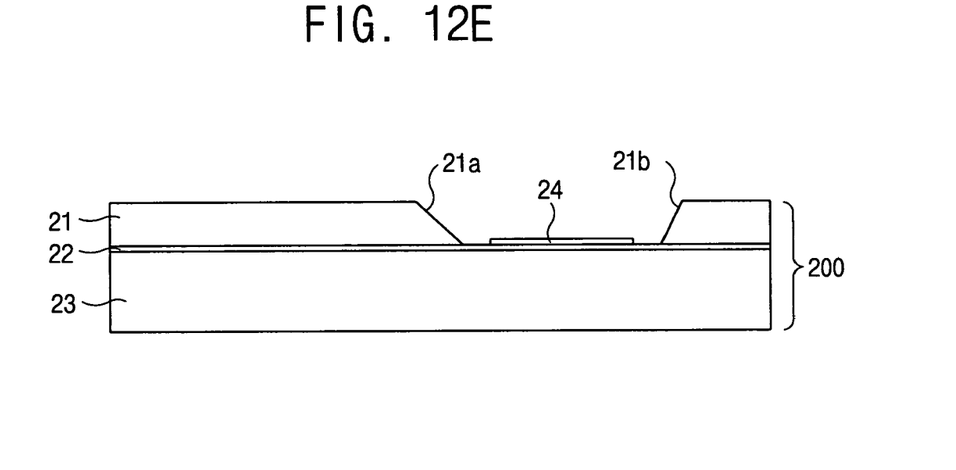
Figure 12F:
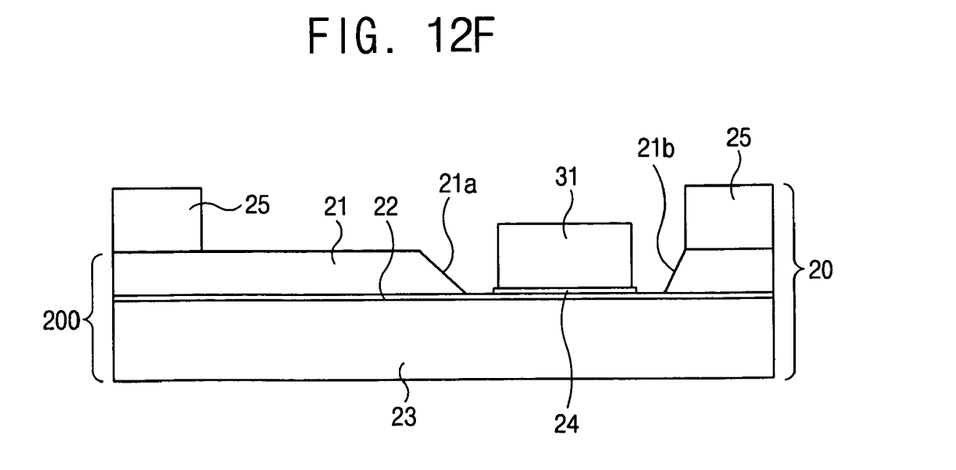

Next, as shown in FIG. 12E, the thick photosensitive film 204 (Refer to FIG. 12D) is melted in organic solvent such as acetone, thereby stripping the photosensitive film 204 and the metal thin film 205 (Refer to FIG. 12D) formed on the photosensitive film 204. According to this, the metal thin film 205 remains only at a predetermined substrate region on the oxidation film 22 where the photosensitive film 204 did not exist, thereby forming an electrode metal pad 24. This patterning method is called as a lift-off. Next, as shown in FIG. 12F, a spacer 25 is aligned/assembled with the SOI substrate 200 where the mirror 21a of 45° and the electrode metal pad 24 are formed by an anodic bonding, an epoxy resin bonding, a solder bonding using a metal solder as a bonding layer, and then diced as an individual chip unit. Then, the laser diode 31 is aligned with the electrode metal pad 24 by using a solder bonding technique, thereby completing the light emitting module 20.

As aforementioned, in the present invention, the ultra-minimized optical detecting module 10 and the light emitting module 20 are manufactured by a micro machining technique and a semiconductor assembly manufacturing process, and the manufactured optical detecting module 10 and the light emitting module 20 are bonded to each other by using epoxy resin thus to manufacture the optical pickup apparatus. According to this, it is possible to manufacture ultra-minimized products, to massively produce products, reduce a component cost, and increase a component uniformity.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An optical detecting module comprising:
   a silicon substrate where a cavity is formed at a middle portion thereof;
   an aperture membrane formed on the cavity of the silicon substrate and provided with an optical aperture for passing light; and
   an array of photodiodes formed at an upper surface of the silicon substrate for receiving light emitted from a light source and an optical signal reflected from an optical disc and converting into an electric signal for detection,
   wherein a spacer is installed at both ends of an upper surface of the silicon substrate.

2. The optical detecting module of claim 1, further comprising a reflective thin film at an upper surface of the aperture membrane.

3. The optical detecting module of claim 1, wherein the array of the photodiodes comprises:
   a common ground electrode;
   an emitted laser beam monitoring photodiode for monitoring an optical output from a light source and maintaining the optical output as a predetermined level through a feedback control circuit;
   radio frequency signal detecting photodiodes having data information included in an optical signal reflected from a recording layer of the optical disc; and
   photodiode segments arranged right and left by being divided into six regions for detecting information of a focus shape and a focus depth of laser beam irradiated on the optical disc substrate.

4. The optical detecting module of claim 1 or 3, wherein each photodiode is a semiconductor P-N junction diode or a P-I-N junction diode.

5. The optical detecting module of claim 1, wherein the spacer is soda lime glass containing Na of a certain concentration.

6. A light emitting module comprising:
   an SOI substrate of a plate type provided with a silicon dioxide film between an upper silicon layer and a lower silicon layer;
   an electrode metal pad attached to a part where the upper silicon layer is stripped among an upper surface of the SOI substrate;
   a laser diode attached to an upper surface of the electrode metal pad; and
   a mirror slantly formed at one side of the upper silicon layer with 45° for reflecting light emitted from the laser diode.

7. The light emitting module of claim 6, wherein a spacer is bonded at both ends of the upper surface of the SOI substrate.

8. The light emitting module of claim 7, wherein the spacer is soda lime glass.

9. An optical pickup apparatus comprising:
   a light emitting module comprising an SOI substrate of a plate type provided with a silicon dioxide film between an upper silicon layer and a lower silicon layer, an electrode metal pad attached to a part where the upper silicon layer is stripped among an upper surface of the SOI substrate, a laser diode attached to an upper surface of the electrode metal pad, and a mirror slantly formed at one side of the upper silicon layer with 45° for reflecting light emitted from the laser diode;
   an optical detecting module comprising a silicon substrate arranged at an upper portion of the light emitting module and provided with a cavity at a middle portion thereof, an aperture membrane formed on the cavity of the silicon substrate and provided with an optical aperture for passing light at a center portion thereof, and a photo diode formed at an upper surface of the silicon substrate for converting light emitted from the laser diode and an optical signal reflected from an optical disc and having information into an electric signal for detection; and
   a spacer bonded between the light emitting module and the optical detecting module for uniformly maintaining a gap therebetween.

10. A method for manufacturing an optical detecting module comprising:
   a first step of patterning a photosensitive film on a silicon substrate by using a silicon substrate of {100} crystal direction doped with n-type impurities as a starting material thus to form an opening window for injecting p type impurities, injecting the p type impurities into the opening window by using the photosensitive film as a mask, and stripping the photosensitive film and performing a thermal process for annealing and diffusion thus to form an intrinsic well;
   a second step of patterning a photosensitive film on the silicon substrate thus to form the p type impurities at a partial region of the intrinsic well, stripping the photosensitive film and performing a thermal process for annealing and diffusion thus to form a photodiode p type junction, and completing a photodiode of an p-I-n junction structure by a thermal process;
   a third step of respectively depositing multi-layered thin films of a three-layer structure of silicon dioxide film/silicon nitride film/silicon dioxide film at upper and lower surfaces of the silicon substrate where the photodiode is completed, stripping a part which has not been covered by the photosensitive film among the multi-layered thin film formed at the upper surface of the silicon substrate by using a photosensitive film patterned by a photolithography process as an etching mask, and then stripping the photosensitive film;

a fourth step of depositing a metal thin film in order to form a photodiode and a reflective thin film on the silicon substrate, patterning a photosensitive film at a surface of the deposited metal thin film by a photolithography process, then selectively stripping the metal thin film by using the photosensitive film as an etching mask, then stripping the photosensitive film, and thereby forming a photodiode metal electrode wire, a metal electrode pad, and the reflective thin film;

a fifth step of depositing a metal thin film on the silicon substrate and then partially etching the etching mask thin film located at a part where an optical aperture will be formed by a photolithography process and a thin film etching technique;

a sixth step of patterning a photosensitive film at a lower surface of the silicon substrate thus to align the photosensitive film with an aperture membrane formed on a wafer, patterning an etching mask thin film at a lower surface of the silicon substrate by using the photosensitive film, and stripping the photosensitive film thus to obtain an etching region which will be processed in the next step by a wet anisotropy silicon etching technique;

a seventh step of etching silicon of a lower surface of the substrate exposed through the etching mask thin film by impregnating with aqueous anisotropic silicon etchant thus to form a cavity;

an eighth step of stripping a multi-layered thin film exposed through the etching mask thin film formed at an upper surface of the silicon substrate by a reactive ion etching, and stripping the mask thin film thus to complete the optical aperture; and a ninth step of bonding a spacer formed of glass material with the silicon substrate as a wafer form, and dicing as an individual chip unit.

11. The method of claim 10, wherein either boron or $BF_2$ is used as the p type impurities in the first step.

12. The method of claim 10, wherein a low stress silicon nitride is respectively deposited at upper and lower surfaces of the silicon substrate by a chemical vapor deposition method in the third step.

13. The method of claim 10, wherein multi-layered thin films having a three-layer structure of silicon dioxide film/ silicon nitride film/silicon dioxide film are respectively deposited at the upper and lower surfaces of the silicon substrate in the third step.

14. The method of claim 10, wherein the photosensitive film is patterned at the lower surface of the silicon substrate by using a both-surface aligning technique in the sixth step.

15. The method of claim 10, wherein the aqueous anisotropic silicon etchant is one of KOH (potassium hydroxidation film), NaOH, TMAH (tetra-methyl ammonium hydroxidation film), and EDP (ethylenediamine pyrocatecol) in the seventh step.

16. A method for manufacturing a light emitting module comprising:

a first step of preparing an SOI substrate as a starting material and respectively forming mask thin films such as a silicon nitride film or a silicon dioxide film which are not etched by anisotropic silicon ethant and which will be used as an anisotropy silicon etching mask layer at upper and lower surfaces of the SOI substrate;

a second step of coating a photosensitive film on a surface of the etching mask thin film formed on an upper silicon layer of the SOI substrate, pattering the photosensitive film by a photolithography process, and stripping the exposed etching mask thin film with a reactive ion etching technique by using the photosensitive film as an etching mask thus to define an anisotropic etching region and strip the remaining photosensitive film;

a third step of etching the upper silicon layer exposed through the etching mask thin film by impregnating with anisotropic silicon etchant thus to firstly stop the etching at {111} crystal plane of the upper silicon layer and then to secondly stop the etching at a silicon dioxide film, and stripping the mask thin films of the upper and lower surfaces of the SOI substrate used as an etching mask after the anisotropic silicon etching processing;

a fourth step of coating a thick photosensitive film on a surface of the upper silicon layer where a crystal plane is formed, patterning by a photolithography, and depositing a metal thin film on the patterned photosensitive film;

a fifth step of melting the thick photosensitive film in organic solvent by impregnation, stripping the photosensitive film and the metal thin film formed on the photosensitive film, and leaving the metal thin film only at a predetermined region of the SOI substrate on the oxidation film where the photosensitive film did not exist thus to form an electrode metal pad; and a sixth step of aligning/assembling a spacer for an alignment/assembly with the SOI substrate where a mirror and the electrode metal pad are formed, then dicing as an individual chip unit, and then aligning the laser diode with the electrode metal pad by using a solder bonding technique.

17. The method of claim 16, wherein the anisotropic silicon etchant is one of KOH, TMAH, EDP, and NaOH in the third step.

18. The method of claim 16, wherein the {111} crystal plane, an etching remaining surface formed after etching the upper silicon layer having a surface slantly polished with 9.74° for a {100} crystal plane has a crystal plane having an inclination of 45° for a surface of the SOI substrate, and another etching remaining surface, a {111} crystal plane facing the inclination surface has an inclination of 64.48° for the surface of the substrate in the third step.

19. The method of claim 16, wherein the glass has crystal planes having an inclination of 45°.

20. The method of claim 16, wherein the spacer is bonded with the SOI substrate by using one of an anodic bonding and an epoxy resin bonding in the sixth step.

21. An optical detecting module comprising:

a silicon substrate where a cavity is formed at a middle portion thereof;

an aperture membrane formed on the cavity of the silicon substrate and provided with an optical aperture for passing light; and an array of photodiodes formed at an upper surface of the silicon substrate for receiving light emitted from a light source and an optical signal reflected from an optical disc and converting into an electric signal for detection, wherein the array of the photodiodes comprises:

a common ground electrode;

an emitted laser beam monitoring photodiode for monitoring an optical output from a light source and maintaining the optical output as a predetermined level through a feedback control circuit;

radio frequency signal detecting photodiodes having data information included in an optical signal reflected from a recording layer of the optical disc; and photodiode segments arranged right and left by being divided into six regions for detecting information of a focus shape and a focus depth of laser beam irradiated on the optical disc substrate.

22. The optical detecting module of claim 21, further comprising a reflective thin film at an upper surface of the aperture membrane.

23. The optical detecting module of claim 21, wherein each photodiode is a semiconductor P-N junction diode or a P-I-N junction diode.

* * * * *